United States Patent
Ito

(10) Patent No.: US 10,386,906 B2
(45) Date of Patent: Aug. 20, 2019

(54) INFORMATION PROCESSING SYSTEM

(71) Applicant: NEC Corporation, Tokyo (JP)

(72) Inventor: Kentaro Ito, Tokyo (JP)

(73) Assignee: NEC Corporation, Tokyo (JP)

( * ) Notice: Subject to any disclaimer, the term of this patent is extended or adjusted under 35 U.S.C. 154(b) by 173 days.

(21) Appl. No.: 15/426,272

(22) Filed: Feb. 7, 2017

(65) Prior Publication Data

US 2017/0228005 A1    Aug. 10, 2017

(30) Foreign Application Priority Data

Feb. 8, 2016 (JP) .................................. 2016-021981

(51) Int. Cl.
| | |
|---|---|
| *G06F 1/26* | (2006.01) |
| *G06F 1/32* | (2019.01) |
| *G06F 1/3215* | (2019.01) |
| *G06F 1/3206* | (2019.01) |
| *G06F 1/329* | (2019.01) |
| *G06F 1/3293* | (2019.01) |

(52) U.S. Cl.
CPC ............ *G06F 1/266* (2013.01); *G06F 1/3206* (2013.01); *G06F 1/329* (2013.01); *G06F 1/3215* (2013.01); *G06F 1/3293* (2013.01); *Y02D 10/122* (2018.01); *Y02D 10/24* (2018.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

2009/0125737 A1*  5/2009  Brey ..................... G06F 1/3203
                                                                713/322

FOREIGN PATENT DOCUMENTS

| JP | 2009-116862 | 5/2009 |
|---|---|---|
| JP | 2011-13764 | 1/2011 |
| JP | 2012-226496 | 11/2012 |
| JP | 2014-174668 | 9/2014 |
| WO | WO 2015/008353 A1 | 1/2015 |

OTHER PUBLICATIONS

Office Action dated Dec. 6, 2016, by the Japanese Patent Office in counterpart Japanese Patent Application No. 2016-021981.

* cited by examiner

*Primary Examiner* — Zahid Choudhury
(74) *Attorney, Agent, or Firm* — Finnegan, Henderson, Farabow, Garrett & Dunner, L.L.P.

(57) ABSTRACT

In a control device of the present invention, a whole upper limit power value, which is the upper limit power value of a whole system including a plurality of information processing devices, and an individual power value range including a predetermined range of values which can be set on each of the information processing devices are stored. The control device includes a setting part configured to set the upper limit power value of each of the information processing devices to a value within the individual power value range so that the total of the upper limit power values of the information processing devices does not exceed the whole upper limit power value.

20 Claims, 11 Drawing Sheets

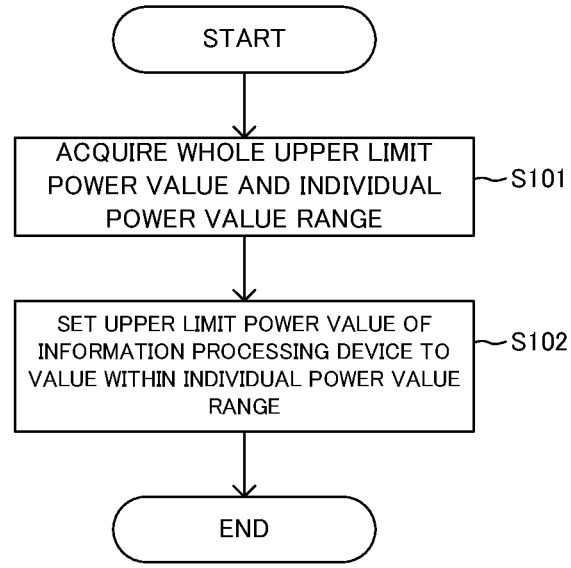
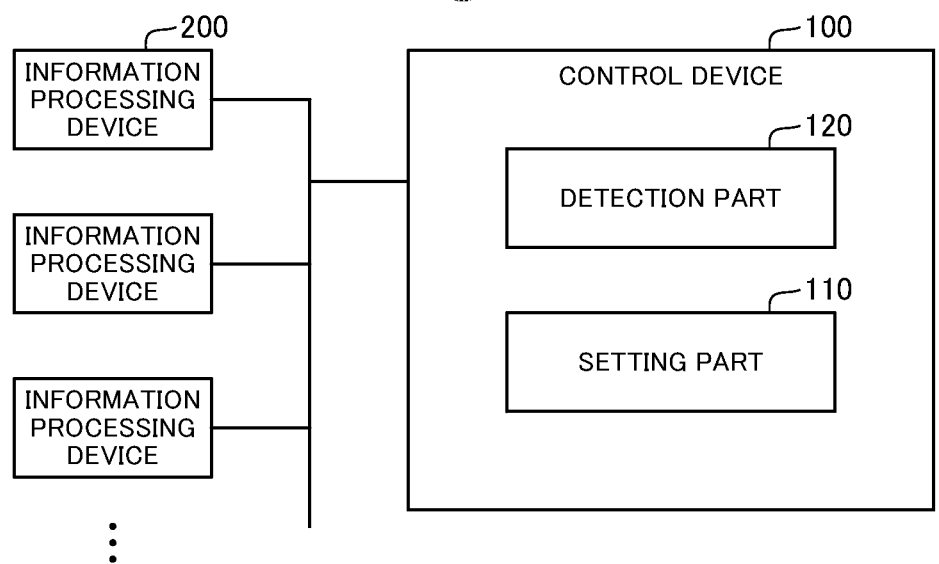

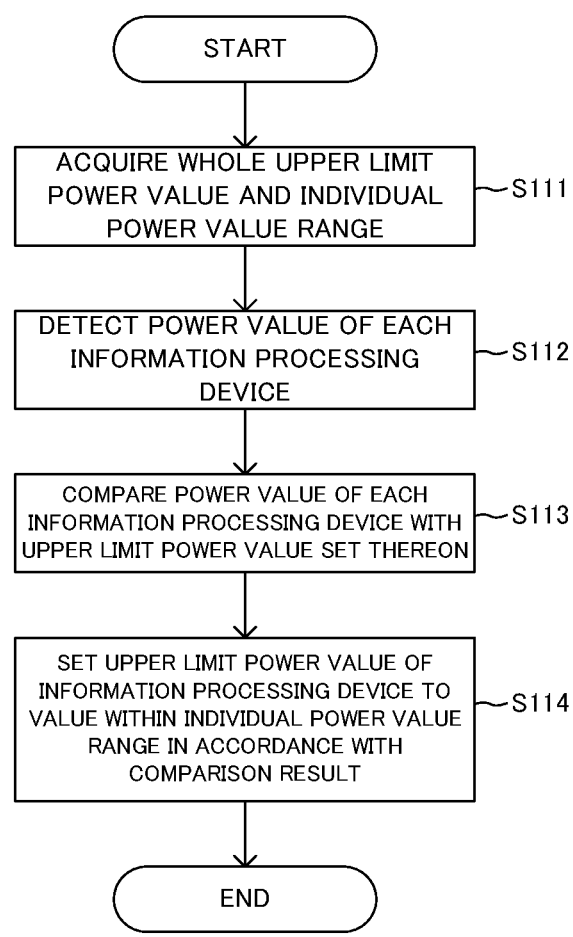

INFORMATION PROCESSING SYSTEM

INCORPORATION BY REFERENCE

This application is based upon and claims the benefit of priority from Japanese patent application No. 2016-021981, filed on Feb. 8, 2016, the disclosure of which is incorporated herein in its entirety by reference.

TECHNICAL FIELD

The present invention relates to an information processing system. More specifically, the present invention relates to an information processing system which shares a power supply among a plurality of information processing devices.

BACKGROUND ART

In facilities such as data centers, efficient placement and operation of server computers is required. For example, as an information processing system, a rack server is configured by mounting a plurality of server computers and a power supply device on a rack, so that the integration density of the physical servers is increased.

In this case, the plurality of server computers share the power supply device, and they share it within an upper limit power value set on the power supply device in total. However, the servers may be brought into a high-load state during operation, and there is a fear that the total power exceeds the upper limit power value set on the power supply device. In order to respond to such a situation, in Patent Document 1, power control on each of the servers is executed so that the total power does not exceed the upper limit power value set on the power supply device.

Patent Document 1: Japanese Unexamined Patent Application Publication No. JP-A 2012-226496

However, in a case where power control on each of the server computers is executed in consideration of the upper limit power value of the whole system as described above, there is a fear that the arithmetic processing performance of the server computers considerably deteriorates. This is because the arithmetic processing performance of the server computers are not necessarily proportional to power consumption. Then, the abovementioned technique causes a problem that, though system down due to power excess of the whole system can be avoided, the arithmetic processing performance of some of the server computers deteriorates and performance of the whole system deteriorates.

SUMMARY OF THE INVENTION

Accordingly, an object of the present invention is to solve the problem that arithmetic processing performance deteriorates while the upper limit power of the whole information processing system is maintained.

In a control device as an aspect of the present invention, a whole upper limit power value and an individual power value range are stored. The whole upper limit power value is an upper limit power value of a whole system including a plurality of information processing devices. The individual power value range includes a predetermined range of values which can be set on each of the information processing devices.

The control device includes a setting part configured to set an upper limit power value of each of the information processing devices to a value within the individual power value range so that a total of upper limit power values of the information processing devices does not exceed the whole upper limit power value.

Further, a control device as another aspect of the present invention includes a setting part configured to set an upper limit power value of each of a plurality of information processing devices to a value within an individual power value range including a predetermined range of values which can be set on each of the information processing devices so that a total of upper limit power values of the information processing devices does not exceed a whole upper limit power value, the whole upper limit power value being an upper limit power value of a whole system including the information processing devices.

Further, a computer-readable medium storing a program as another aspect of the present invention is a computer-readable medium storing a program including instructions for causing a control device to realize a setting part configured to set an upper limit power value of each of a plurality of information processing devices to a value within an individual power value range including a predetermined range of values which can be set on each of the information processing devices so that a total of upper limit power values of the information processing devices does not exceed a whole upper limit power value, the whole upper limit power value being an upper limit power value of a whole system including the information processing devices.

Further, a control method as another aspect of the present invention includes setting an upper limit power value of each of a plurality of information processing devices to a value within an individual power value range including a predetermined range of values which can be set on each of the information processing devices so that a total of upper limit power values of the information processing devices does not exceed a whole upper limit power value, the whole upper limit power value being an upper limit power value of a whole system including the information processing devices.

With the configurations as described above, the present invention can restrict deterioration of arithmetic processing performance, while maintaining the upper limit power of the entire information processing system.

BRIEF DESCRIPTION OF DRAWINGS

FIG. 11 is a flowchart showing an operation of the control device in the second exemplary embodiment of the present invention:

FIG. 12 is a block diagram showing another configuration of the control device in a third exemplary embodiment of the present invention; and FIG. 13 is a flowchart showing an operation of the control device in the third exemplary embodiment of the present invention.

EXEMPLARY EMBODIMENT

First Exemplary Embodiment

Figure 1:
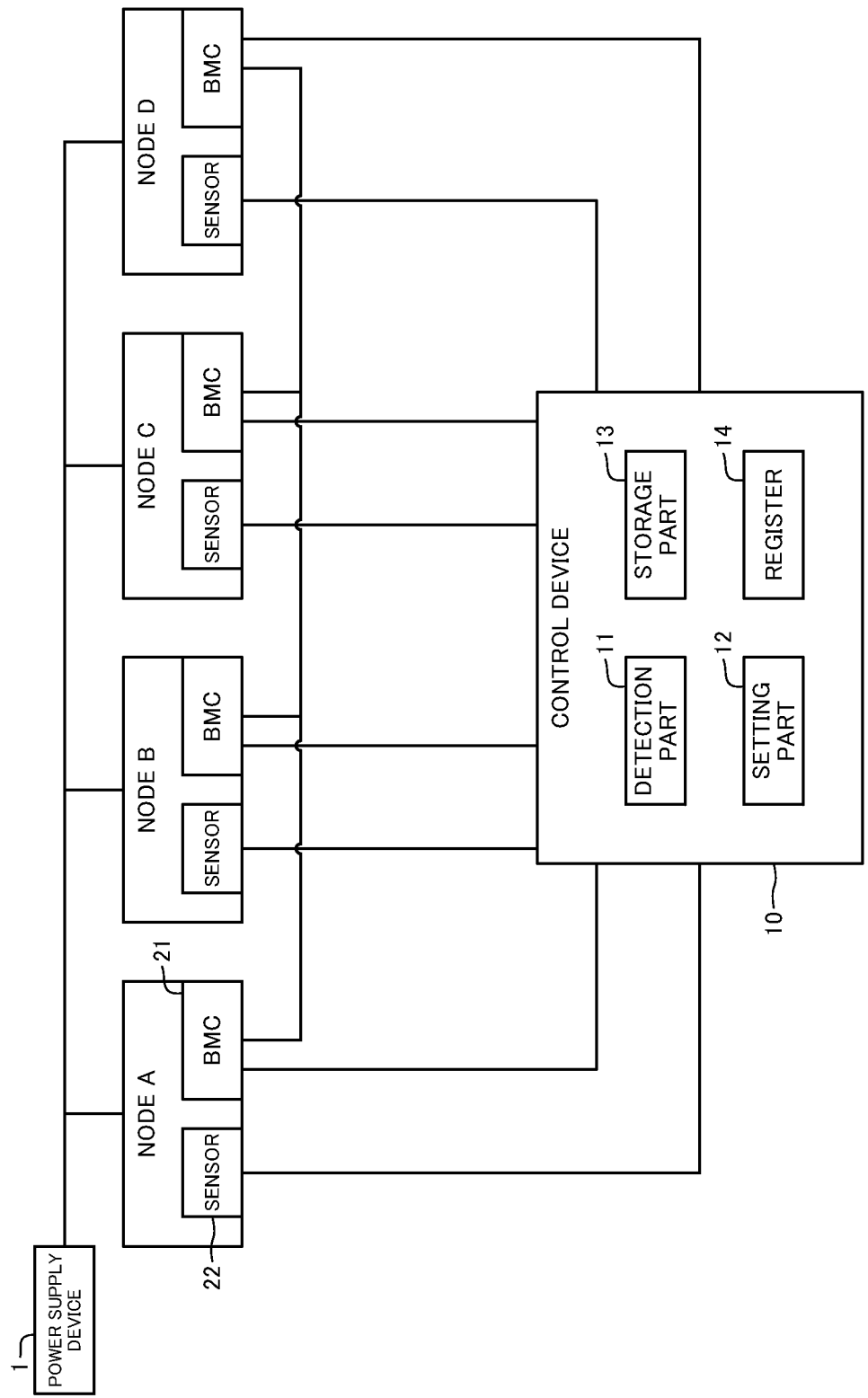
FIG. 1 is a block diagram showing the configuration of an information processing system in a first exemplary embodiment of the present invention.
Figure 2:
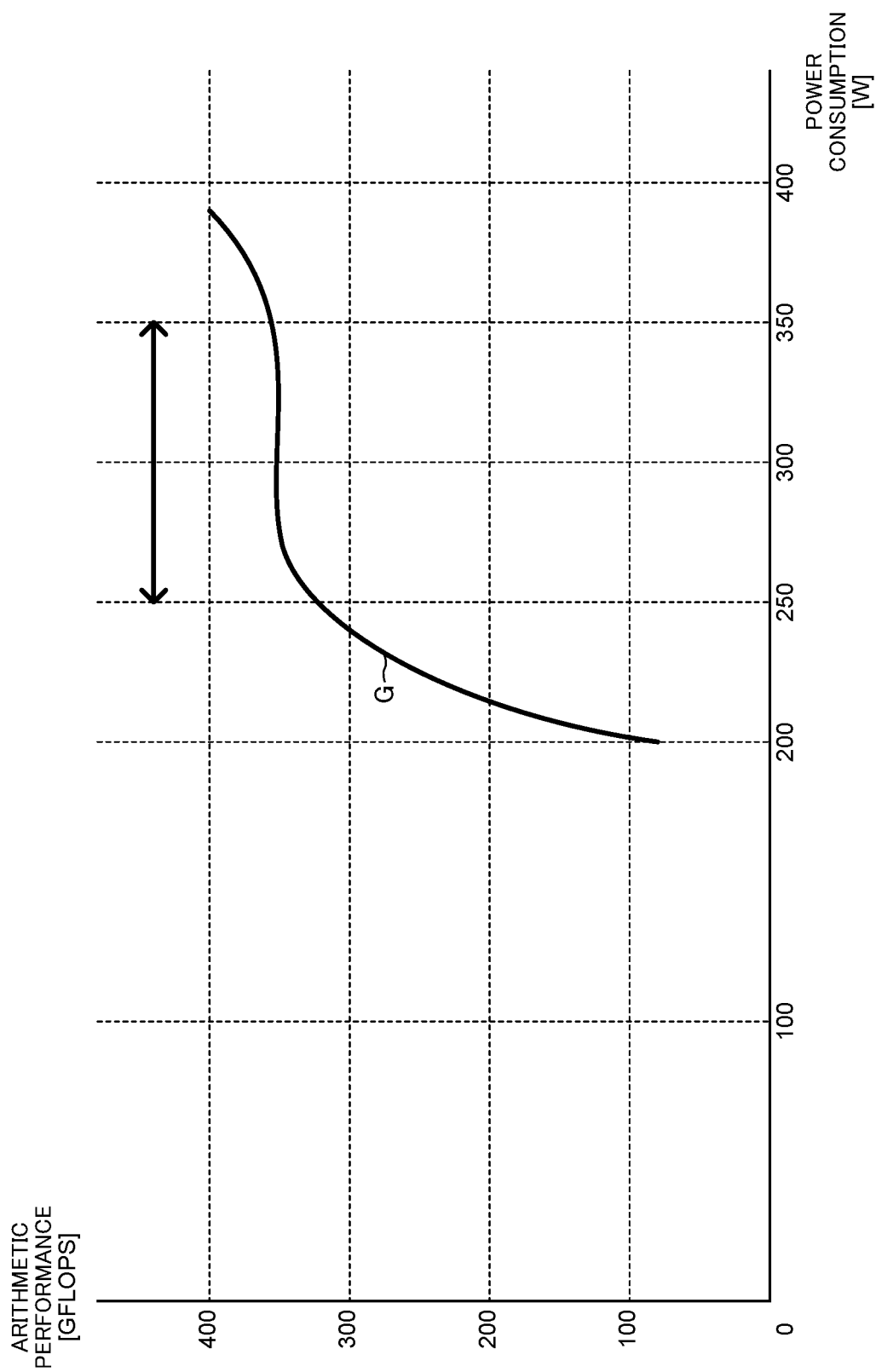
FIG. 2 is a diagram showing the relation between upper limit power of a node disclosed in FIG. 1 and arithmetic processing performance.
Figure 6:
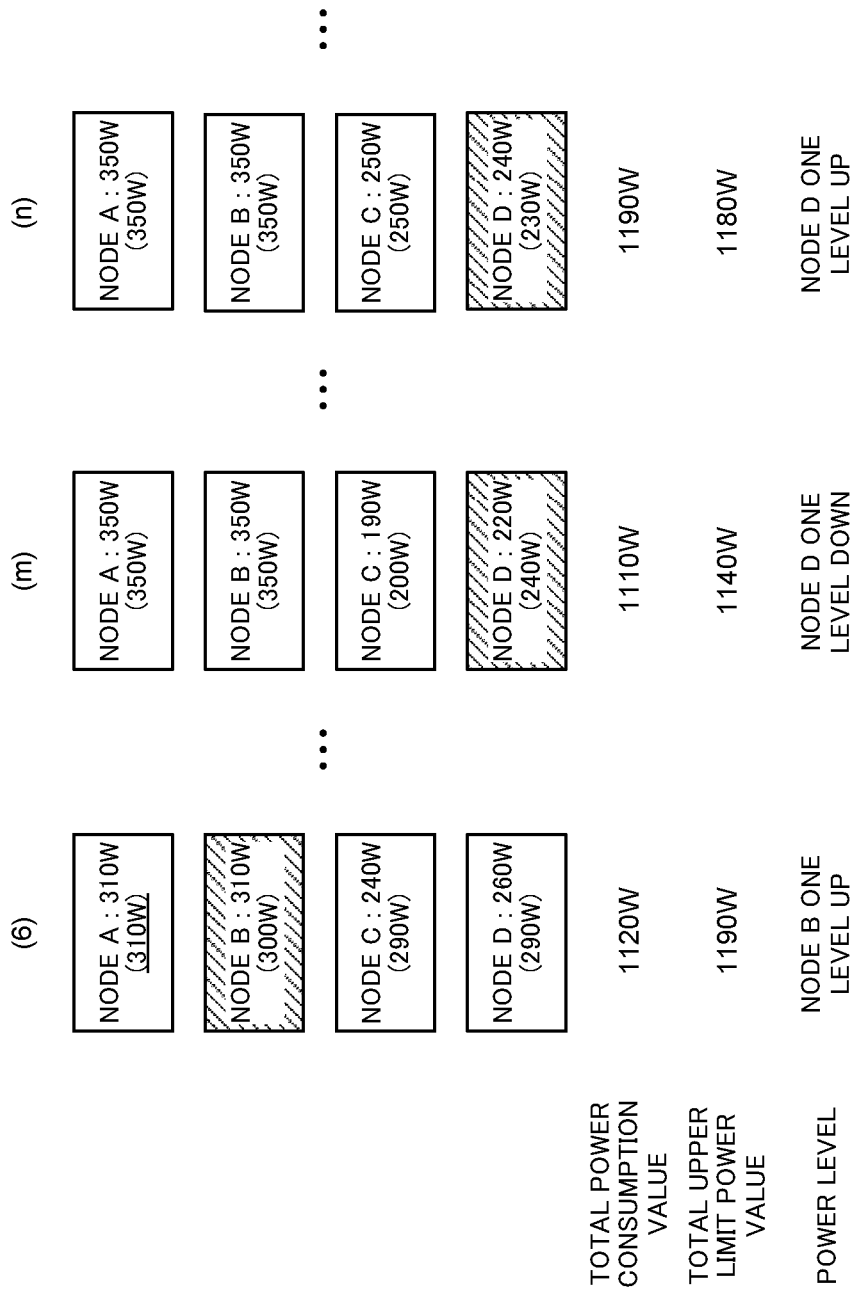
FIG. 6 is a diagram showing the way the upper limit power value for each node disclosed in FIG. 1 is set.
Figure 7:
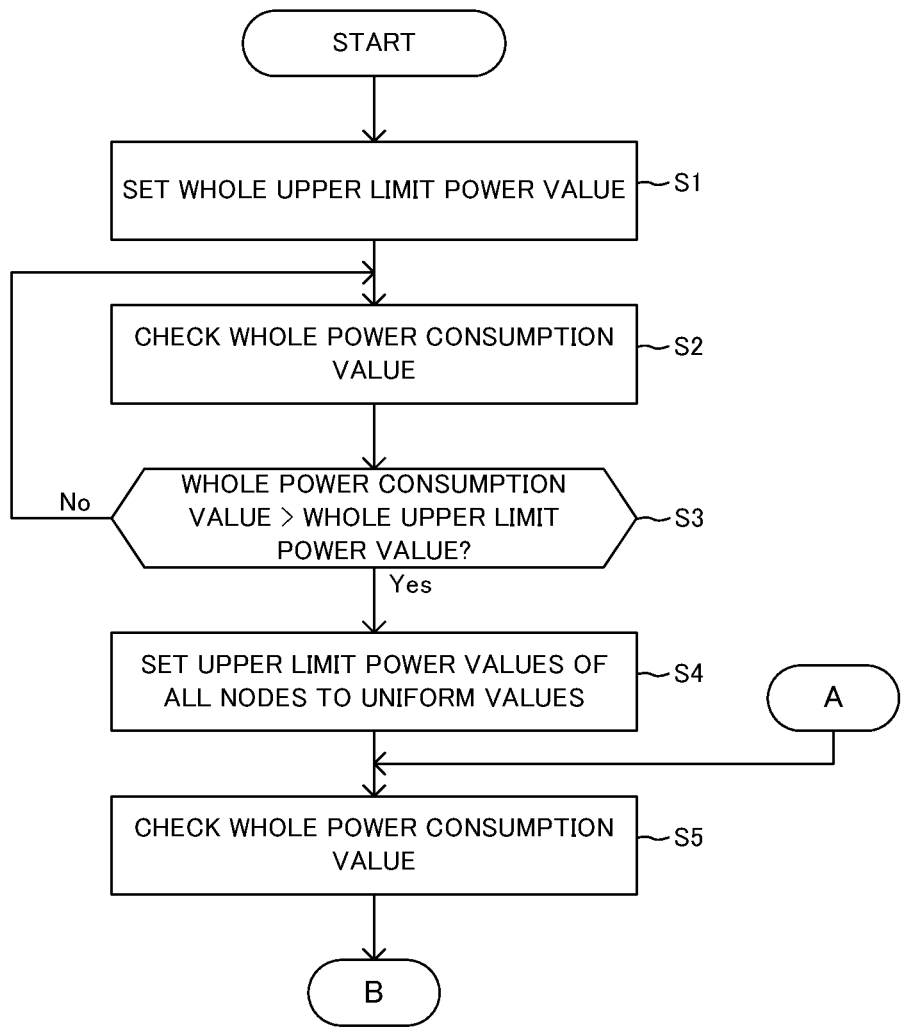
FIG. 7 is a flowchart showing an operation of a control device disclosed in FIG. 1.
Figure 8:
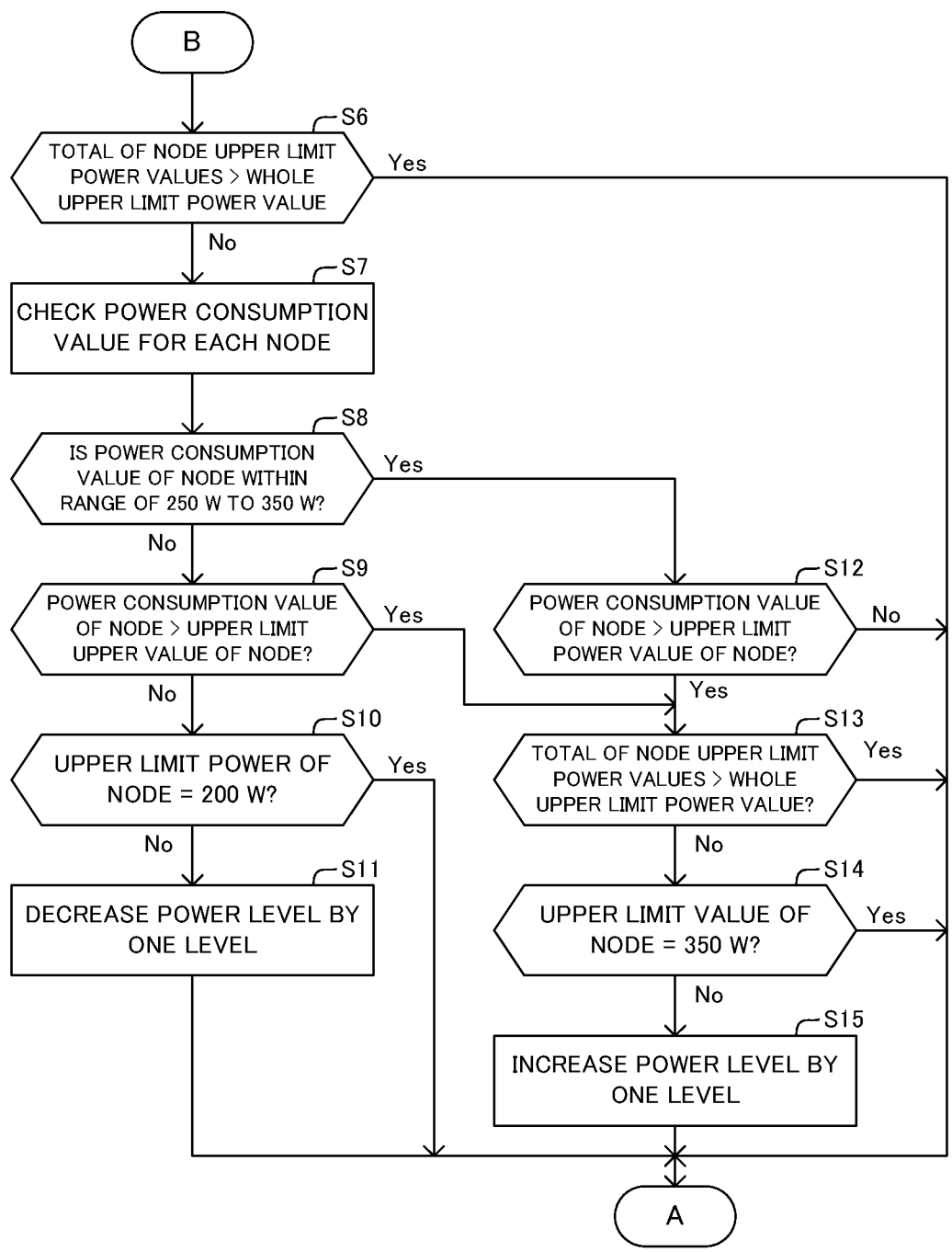
FIG. 8 is a flowchart showing the operation of the control device disclosed in FIG. 1.

A first exemplary embodiment of the present invention will be described with reference to FIGS. 1 to 8. FIG. 1 is a diagram for describing the configuration of an information processing system in the first exemplary embodiment. FIG. 2 is a diagram showing the relation between upper limit power of a node and arithmetic processing performance. FIGS. 3 to 6 are diagrams showing the way the upper limit power value for each node is set. FIGS. 7 and 8 are flowcharts showing the operation of the control device.

As shown in FIG. 1, the information processing system in this exemplary embodiment includes a plurality of nodes A to D, which are information processing devices each including an arithmetic device and a storage device, a power supply device 1 supplying power to the nodes A to D, and a control device 10 controlling supply of power to the nodes A to D by the power supply device 1.

For example, the information processing system is configured in the form of a rack server. In other words, the information processing system is formed by placing each device configuring the information processing system on each shelf of a rack having a plurality of shelves. As one example, the information processing system is configured by mounting a server group composed of the plurality of nodes A to D, the power supply device 1, and a rack manager including the control device 10 on each unit which is each shelf of the server rack. However, the information processing system is not limited to the configuration in the form of a rack server.

The nodes A to D operate when supplied with power by the power supply device 1. The nodes A to D then share the power supply device 1 among them. Therefore, the nodes A to D share the power supply device 1 within the range of a whole upper limit power value, which is set in the power supply device 1 and represents the upper limit value of supplied power. In other words, a whole upper limit power value is the upper limit value of power supplied by the power supply device 1 to the whole system configured by the plurality of nodes A to D, and is predetermined in accordance with the performance of the power supply device 1.

For each of the nodes A to D, a node upper limit power value is set, which is the upper limit value of power supplied thereto. Because a node upper limit power value is set for each of the nodes A to D, the values for the respective nodes A to D may be different. The respective nodes A to D are supplied with power by the power supply device 1 within the node upper limit power value set thereon.

Power consumption of each of the nodes A to D varies depending on its operation state. For example, when load is low, the value of the power consumption is lower than the node upper limit power value, whereas when load is high, the value of the power consumption is high and may be more than the node upper limit power value. In other words, in a case where any of the nodes A to D needs more power than its node upper limit power value when load is high, the node may be supplied with more power than its node upper limit value. Accordingly, the power supply device 1 may supply the nodes A to D with power which is more than the whole upper limit power value.

Further, each of the nodes A to D includes a BMC (Base Management Controller) 21 monitoring installed hardware, and a sensor 22 (a detection part) which detects power consumption. The sensor 22 detects power consumed in detection by the node with the sensor 22 installed, as power consumption. The sensor 22 detects power consumed by the node in response to an instruction by a detection part 11 of the control device 10, which will be described later, and notifies it to detection part 11.

The control device 10 is formed of an information processing device including an arithmetic device and a storage device. The control device 10 includes the detection part 11 and a setting part 12 which are structured by installing a program into the arithmetic device included thereby. Moreover, the control device 10 includes a storage part 13 formed in the storage device included thereby and a register 14 which temporarily stores information. Meanwhile, the storage part 13 may be provided outside the control device 10.

In the storage part 13, a "whole upper limit power value" is stored, which is set in the power supply device 1 and represents the upper limit value of power supplied to all the nodes A to D. The whole upper limit power value is determined in accordance with the performance of the power supply device 1 and stored by the operator into the storage part 13 in advance. However, the whole upper limit power value may not be stored in the control device 10 and may be acquired from outside by the control device 10.

Further, in the storage part 13, an "individual power value range" is stored, which represents the upper limit value of power that can be set individually on each of the nodes A to D, and which is composed of values in a given range. The individual power value range represents the range of values set in accordance with the characteristic of each of the nodes A to D, specifically, power values determined to exhibit high arithmetic processing efficiency with respect to power consumption. An individual power value range set in this exemplary embodiment will be described with reference to FIG. 2.

FIG. 2 is a graph G showing the relation between power consumption (W) and arithmetic processing performance (GFLOPS) of a node. As shown in this graph G, arithmetic processing performance of the node is not necessarily proportion to power consumption. Therefore, a range of power consumption values determined by a preset criterion to show high arithmetic processing performance with respect to power consumption is set as an individual power value range. In other words, a range of power consumption values where higher arithmetic performance can be obtained with lower power consumption is set as an individual power value range. In the example shown in FIG. 2, as shown with an arrow, the range of "250 W to 350 W" is set as an individual power value range. A value in this range is mainly set as a node upper limit value, which is the upper limit value of power consumption of each of the nodes A to D as described later.

In this exemplary embodiment, the nodes A to D all have the same configurations and the same performances, so that the individual power value ranges of the nodes A to D are the same ranges. However, the individual power value ranges of the nodes A to D may be different from each other. For example, in a case where the nodes A to D have different configurations, performances, uses, and so on, different individual power value ranges may be used depending on the characteristics of the respective nodes A to D.

The detection part 11 detects power consumptions of the nodes A to D. To be specific, the detection part 11 issues an instruction to detect power consumption to the sensor 22 of each of the nodes A to D, and detects power consumptions returned by the sensors 22 of the respective nodes A to D in response to the instruction, as power consumptions of the nodes A to D. Then, the detection part 11 notifies the setting part 12 of the detected power consumptions of the respective nodes A to D, or stores the total value of the power consumptions of the respective nodes A to D as a whole power consumption value into the register 14.

The detection part 11 detects power consumptions of the respective nodes A to D in sequence. Specifically, as described later, in executing a process of setting the node upper limit value for each of the nodes A to D, for example, the detection part 11 detects the power consumptions of the nodes A to D one by one every given time interval or every time the last setting process ends. Meanwhile, the detection part 11 may detect the power consumptions of the respective nodes A to D at one time.

The setting part 12 sets a node upper limit power value, which is the upper limit value of power for each node, on each of the nodes A to D. For example, the setting part 12 sets equal upper limit power values on all the nodes A to D, or individually sets a node upper limit power value for each of the nodes A to D. Below, an specific example of the process of setting node upper limit power values on the nodes A to D will be described with reference to FIGS. 3 to 8.

Figure 3:
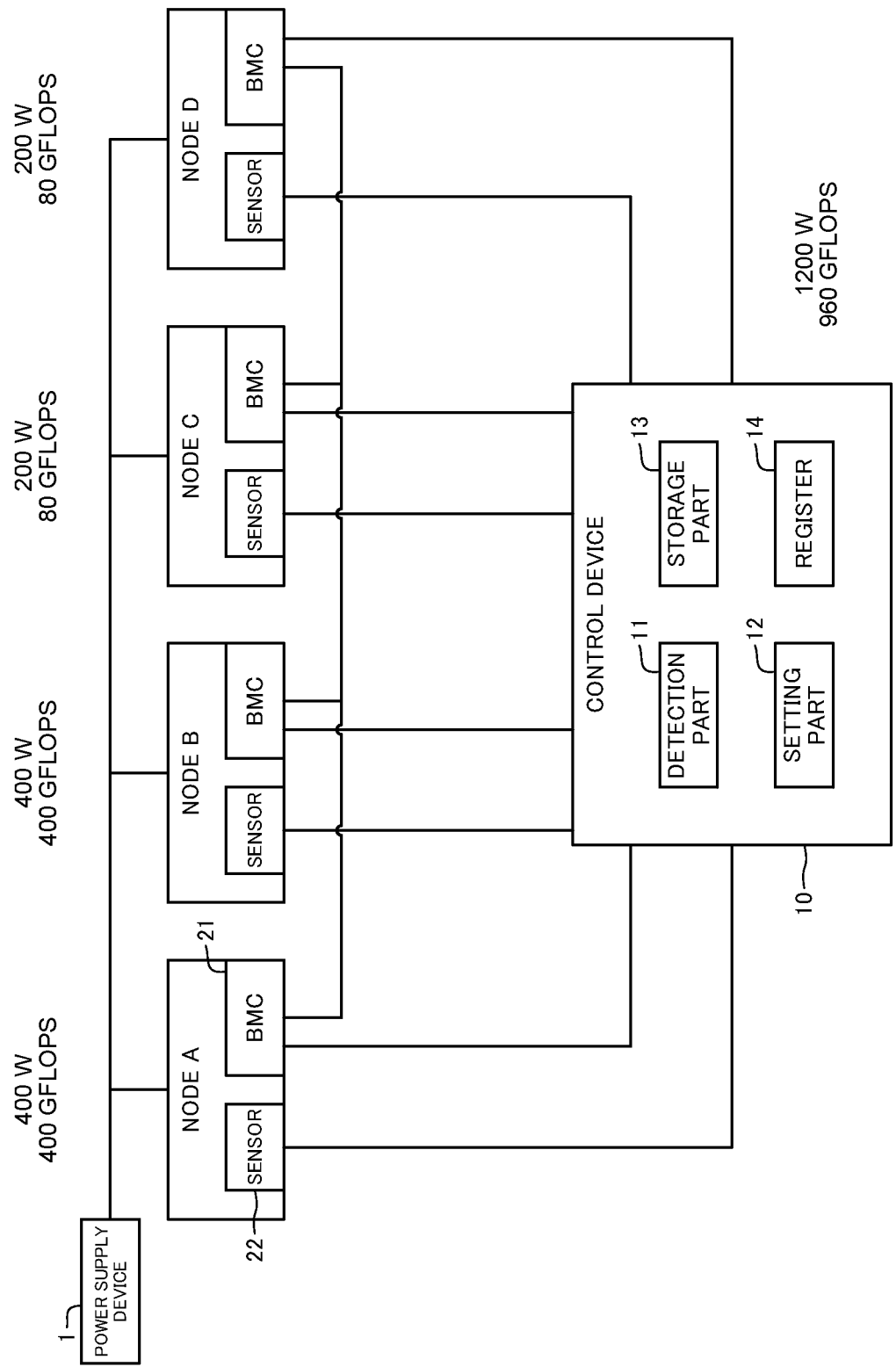
FIG. 3 is a diagram showing the way the upper limit power value for each node disclosed in FIG. 1 is set.

Now, the process of setting equal upper limit power values on all the nodes A to D will be described with reference to FIGS. 3 and 4 and a flowchart of FIG. 7. First, in an information processing system including four nodes A to D as shown in FIG. 3, a whole upper limit power value, which is the upper limit value of total power, is set and stored into the storage part 13 (step S1 of FIG. 7). In this example, the whole upper limit power value is set to 1200 W.

Further, in this example, as described on the first line above each of the nodes A to D in FIG. 3, a node upper limit power value (W) is set on each of the nodes A to D. Meanwhile, on the second line above each of the nodes A to D in FIG. 3, arithmetic processing performance (GFLOPS) in the case of operating at the set node upper limit power value (W) is described. For example, 400 W is set as the upper limit power value in the nodes A and B, and 200 W is set as the upper limit power value in the nodes C and D. In this case, as described in the lower right portion of FIG. 3, the total of the upper limit power values of all the nodes A to D is 1200 W, and arithmetic processing performance at this moment is 960 GFLOPS.

After that, power consumptions of the respective nodes A to D are detected by the detection part 11, and a whole power consumption value, which is the total of the power consumptions of the respective nodes A to D, is stored into the register 14 (step S2 of FIG. 7). Then, the setting part 12 compares the whole power consumption value stored in the register 14 with the whole upper limit power value stored in the storage part 13 (step S3 of FIG. 7). As a result of the comparison, in a case where the whole power consumption value is more than the whole upper limit power value (step S3 of FIG. 7: Yes), the setting part 12 sets equal node upper limit power values on all the nodes A to D (step S4 of FIG. 7).

To be specific, the setting part 12 sets upper limit power values set on the respective nodes A to D to values within the individual power value range stored in the storage part 13, and also keeps the total of the upper limit power values set on all the nodes A to D from exceeding the whole upper limit power value. In this example, the individual power value range is "250 W to 350 W" and the whole upper limit power value is "1200 W," so that the setting part 12 sets an upper limit power value set to be equal on all the nodes A to D, to "300 W." Consequently, the nodes A to D operate with power less which the set node upper limit power value.

Figure 4:
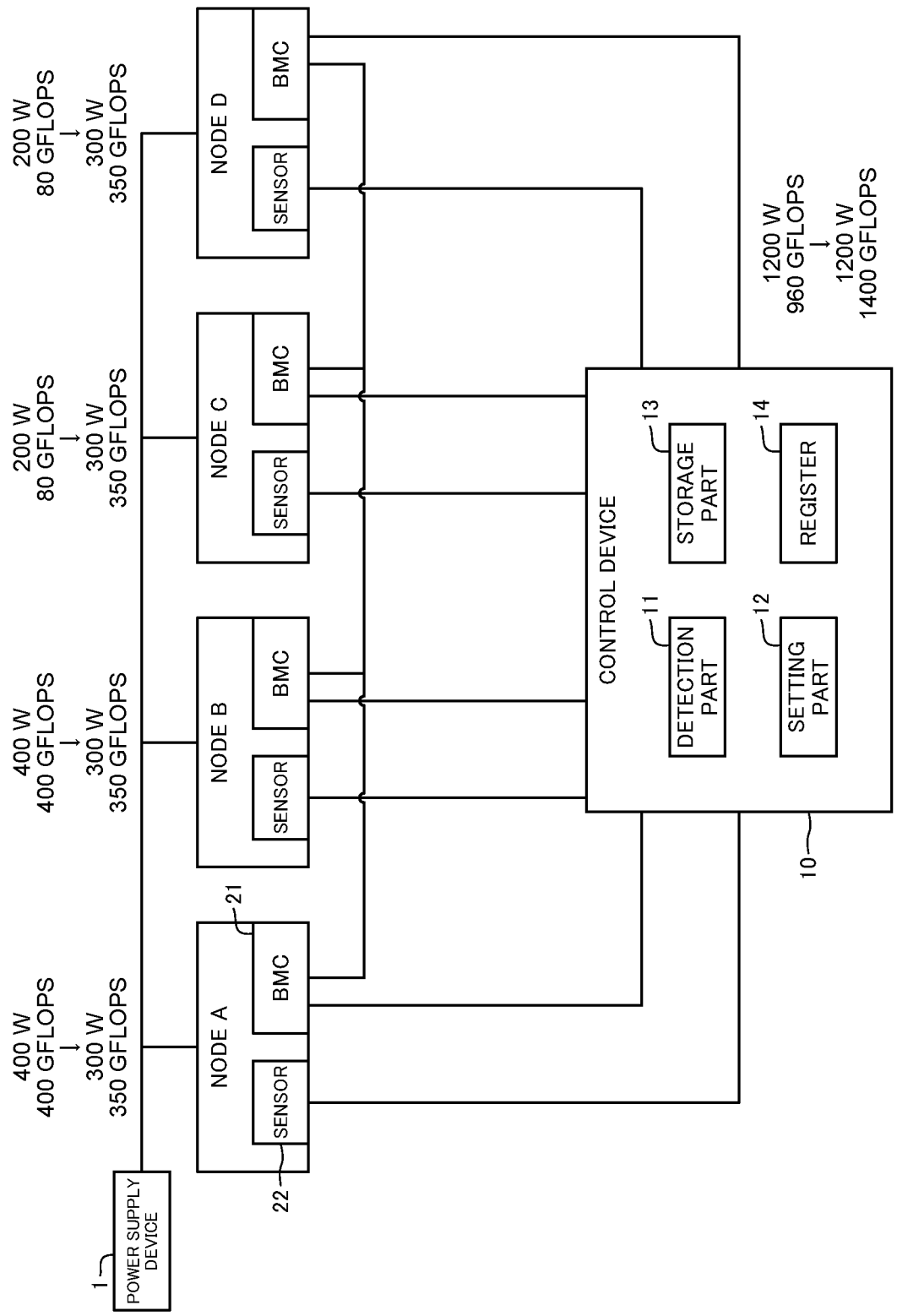
FIG. 4 is a diagram showing the way the upper limit power value for each node disclosed in FIG. 1 is set.

Now, a state where an upper limit power value "300 W" is set on all the nodes A to D is shown in FIG. 4. As described in FIG. 4, arithmetic processing performances of the nodes A to D are 350 GFLOPS, respectively. Then, as described in the lower right portion of FIG. 4, the total of the upper limit power values of all the nodes A to D is "1200 W" and is not more than the whole upper limit power value, and the total of the arithmetic processing performances at this moment is "1400 GFLOPS" and is a large value before the setting of the power value is changed. Thus, to whole power consumption of all the nodes A to D does not increase and it is possible to increase the arithmetic performance.

In the above description, the node upper limit power values of the nodes A to D are set to equal values, but the upper limit power values may not be set equal on the nodes A to D. For example, within the individual power value range, different node upper limit power values may be set for each of the nodes A to D. Moreover, in the above description, node upper limit power values are set on the respective nodes A to D in a case where the whole power consumption value is more than the whole upper limit power value, but the node upper limit value for each of the nodes A to B may be set at any timing.

After thus setting the node upper limit power values, the setting part 12 checks the total of power consumptions of the respective nodes A to D and the total of the node upper limit power values via the detection part 11 (step S5 of FIG. 7). Then, after that, the setting part 12 executes a process of individually setting a node upper limit power value for each of the nodes A to D. The way this process is executed will be described with reference to flowcharts of FIGS. 5, 6 and 8. The process described below is not limited to a case of executing after setting the node upper limit power values of the respective nodes A to D to equal values as described above, and may be executed any timing.

In the following process, in accordance with the magnitude relation between power consumption of each of the nodes A to D and a node upper limit power value, the node upper limit power value is set by changing mainly within an individual power value range. For example, in a case where the power consumption value of the node is more than the node upper limit power value, the node is short of power, so that the node upper limit value is raised and set. On the other hand, in a case where the power consumption value of the node is less than the node upper limit power value, the node has surplus power, so that the node upper limit value is reduced and set. Moreover, in a case where the power consumption of the node is less than the individual power value range, the node upper limit value is reduced and set to a value smaller than the individual power value range (herein, 200 W is the lower limit value).

Furthermore, in the following process, a node upper limit power value to be set is set in accordance with the following "power levels:"

Power level 1: limit to 350 W or less;
Power level 2: limit to 340 W or less;
Power level 3: limit to 330 W or less;
Power level 4: limit to 320 W or less;
Power level 5: limit to 310 W or less;
Power level 6: limit to 300 W or less;
Power level 7: limit to 290 W or less;
Power level 8: limit to 280 W or less;
Power level 9: limit to 270 W or less;
Power level 10: limit to 260 W or less;
Power level 11: limit to 250 W or less;
Power level 12: limit to 240 W or less;
Power level 13: limit to 230 W or less;
Power level 14: limit to 220 W or less;
Power level 15: limit to 210 W or less; and
Power level 16: limit to 200 W or less.

Figure 5:
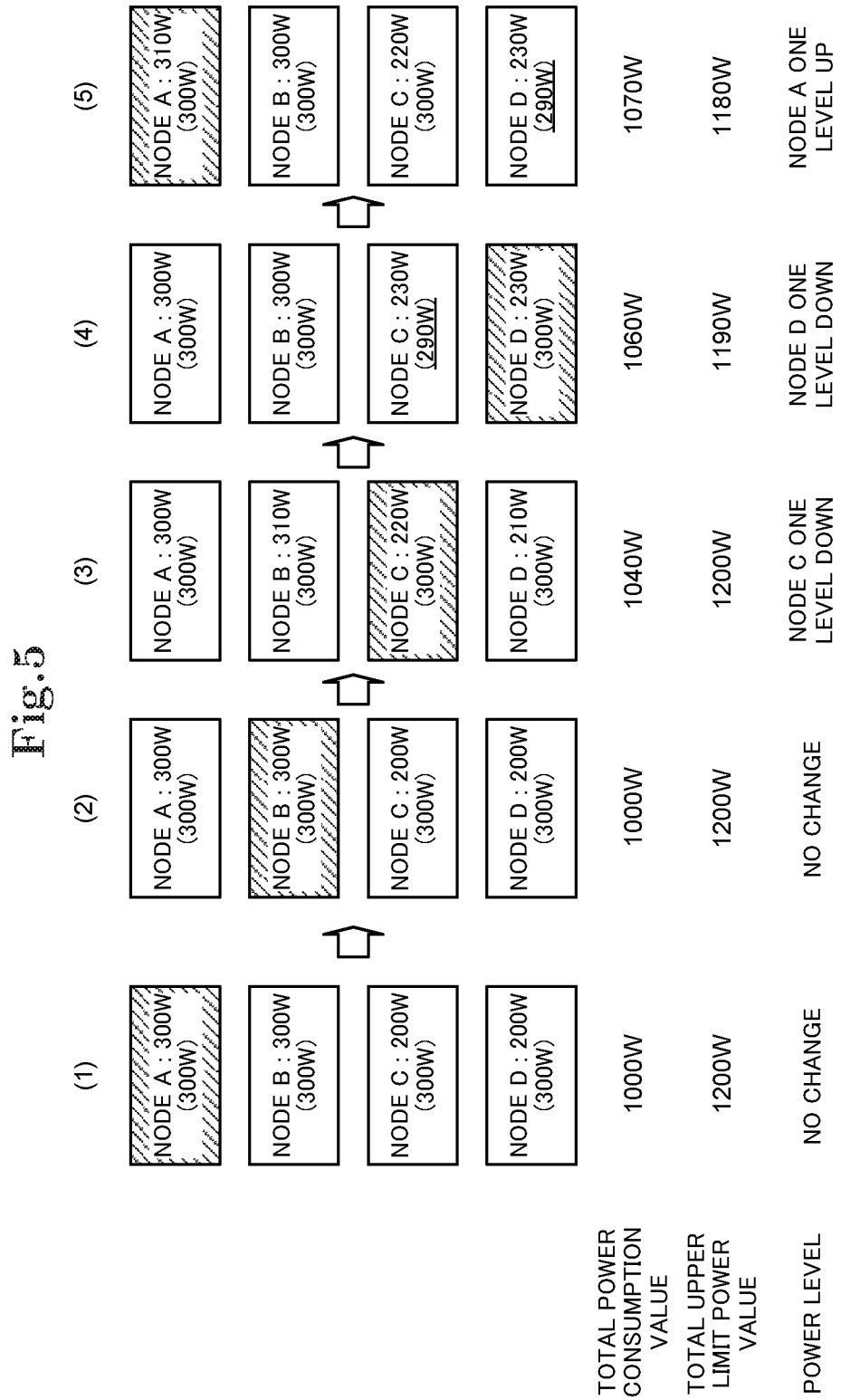
FIG. 5 is a diagram showing the way the upper limit power value is set for each node disclosed in FIG. 1.

As shown in parenthesis on the second line within each node in FIG. 5 (1), the node upper limit power values of all the nodes A to D are set to the power level 6 (300 W). Moreover, as shown on the right side on the first line within each node in FIG. 5 (1), power consumptions of the respective nodes A to D are 300 W, 300 W, 200 W and 200 W. Under this condition, the detection part 11 detects power consumption in order of the node A, B, C and D, and every time detecting power consumption of each of the nodes A to D, the setting part 12 sets the node upper limit power value of the detection target node.

First, in the condition of FIG. 5 (1), the "node A" is the target of setting. In a case where the total of the node upper limit power values is not more than the whole upper limit power value (step S6 of FIG. 8: Yes), the setting part 12 detects the power consumption of the node A via the detection part 11 (step S7 of FIG. 8). Then, the setting part 12 checks whether or not the power consumption of the node A is a value within the individual power value range (250 to 350 W) stored in the storage part 13 (step S8 of FIG. 8). In this condition, the power consumption of the node A (300 W) is within the individual power value range (step S8 of FIG. 8: Yes) and is not more than the node upper limit power value of the node A (300 W) (step S12 of FIG. 8: No). Therefore, the setting part 12 does not change the power level, namely, the node upper limit power value of the node A and keeps it 300 W.

Subsequently, in the condition of FIG. 5 (2), the "node B" is the target of setting. In a case where the total of the node upper limit power values is not more than the whole upper limit power value (step S6 of FIG. 8: Yes), the setting part 12 detects the power consumption of the node B via the detection part 11 (step S7 of FIG. 8). Then, the setting part 12 checks whether or not the power consumption of the node B is a value within the individual power value range (250 to 350 W) stored in the storage part 13 (step S8 of FIG. 8). In this condition, the power consumption of the node B (300 W) is within the individual power value range (step S8 of FIG. 8: Yes) and is not more than the node upper limit power value of the node B (300 W) (step S12 of FIG. 8: No). Therefore, the setting part 12 does not change the power level, namely, the node upper limit power value of the node B and keeps it 300 W.

Subsequently, in the condition of FIG. 5 (3), the "node C" is the target of setting. In a case where the total of the node upper limit power values is not more than the whole upper limit power value (step S6 of FIG. 8: Yes), the setting part 12 detects the power consumption of the node C via the detection part 11 (step S7 of FIG. 8). Then, the setting part 12 checks whether or not the power consumption of the node C is a value within the individual power value range (250 to 350 W) stored in the storage part 13 (step S8 of FIG. 8). In this condition, the power consumption of the node C (220 W) is not within the individual power value range (step S8 of FIG. 8: No) and is not more than the node upper limit power value of the node C (220 W) (step S9 of FIG. 8: No). Because the node upper limit power value of the node C (300 W) is not the lower limit value (200 W) (step S10 of FIG. 8: No), the setting part 12 sets the power level of the node C one level down to the power level 7, thereby setting the node upper limit power value decreased from 300 W to 290 W (step S11 of FIG. 8) (see the underlined second line of the node C in FIG. 5 (4)).

Subsequently, in the condition of FIG. 5 (4), the "node D" is the target of setting. In a case where the total of the node upper limit power values is not more than the whole upper limit power value (step S6 of FIG. 8: Yes), the setting part 12 detects the power consumption of the node D via the detection part 11 (step S7 of FIG. 8). Then, the setting part 12 checks whether or not the power consumption of the node D is a value within the individual power value range (250 to 350 W) stored in the storage part 13 (step S8 of FIG. 8). In this condition, the power consumption of the node D (230 W) is not within the individual power value range (step S8 of FIG. 8: No), and the power consumption of the node D (230 W) is not more than the node upper limit power value (300 W) (step S9 of FIG. 8: No). Because the node upper limit power value of the node D (300 W) is not the lower limit value (200 W) (step S10 of FIG. 8: No), the setting part 12 sets the power level of the node D one level down to the power level 7, thereby setting the node upper limit power value decreased from 300 W to 290 W (step S11 of FIG. 8) (see the underlined second line of the node D in FIG. 5 (5)).

Subsequently, in the condition of FIG. 5 (5), the "node A" is the target of setting. In a case where the total of the node upper limit power values is not more than the whole upper limit power value (step S6 of FIG. 8: Yes), the setting part 12 detects the power consumption of the node A via the detection part 11 (step S7 of FIG. 8). Then, the setting part 12 checks whether or not the power consumption of the node A is a value within the individual power value range (250 to 350 W) stored in the storage part 13 (step S8 of FIG. 8). In this condition, the power consumption of the node A (310 W) is within the individual power value range (step S8 of FIG. 8: Yes), and the power consumption of the node A (310 W) is more than the node upper limit power value (300 W) (step S12 of FIG. 8: Yes). The total of the node upper limit power values (1180 W) is not more than the whole upper limit power value (1200 W) (step S13 of FIG. 8: No), and the node upper limit power value of the node A (300 W) is not the upper limit value of the individual power value range (350 W) (step S14 of FIG. 8: No). Therefore, the setting part 12 sets the power level of the node A one level up to the power level 5, thereby setting the node upper limit power value increased from 300 W to 310 W (steps S15 of FIG. 8) (see the underlined second line of the node A of FIG. 6 (6).

Subsequently, in the condition of FIG. 6 (6), the "node B" is the target of setting. In this case, as in the case of the node A of FIG. 5 (5) described above, the setting part 12 sets the power level of the node B one level up to the power level 5, thereby setting the node upper limit value increased from 300 W to 310 W (step S15 of FIG. 8).

After that, in the condition of FIG. 6(m) through some steps, the "node D" is the target of setting. Then, in a case where the total of the node upper limit power values is not more than the whole upper limit power value (step S6 of FIG. 8: Yes), the setting part 12 detects the power consumption of the node D via the detection part 11 (step S7 of FIG. 8). Then, the setting part 12 checks whether or not the power consumption of the node D is a value within the individual power value range (250 to 350 W) stored in the storage part 13 (step S8 of FIG. 8). In this condition, the power consumption of the node D (220 W) is not within the individual power value range (step S8 of FIG. 8: No), and the power consumption of the node D (220 W) is not more than the node upper limit power value (240 W) (step S9 of FIG. 8: No). Because the node upper limit power value of the node D (240 W) is not the lower limit value (200 W) (step S10 of FIG. 8: No), the setting part 12 sets the power level of the node D one more level down, thereby setting the node upper limit power value decreased from 240 W to 230 W (step S11 of FIG. 8). Thus, in a case where the power consumption of the node is lower than the lower limit value (250 W) of the individual power value range, the setting part 12 sets the node upper limit power value down to a smaller value than the lower limit value (250 W) of the individual power value range.

After that, in the condition of FIG. 6(n) through some more steps, the "node D" is the target of setting. Then, in a case where the total of the node upper limit power values is not more than the whole upper limit power value (step S6 of FIG. 8: Yes), the setting part 12 detects the power consumption of the node D via the detection part 11 (step S7 of FIG. 8). Then, the setting part 12 checks whether or not the power consumption of the node D is a value within the individual power value range (250 to 350 W) stored in the storage part 13 (step S8 of FIG. 8). In this condition, the power consumption of the node D (240 W) is not within the individual power value range (step S8 of FIG. 8: No), and the power consumption of the node D (240 W) is more than the node upper limit power value (230 W) (step S9 of FIG. 8: Yes). The total of the node upper limit power values (1190 W) is not more than the whole upper limit power value (1200 W) (step S13 of FIG. 8: No), and the node upper limit power value of the node D (230 W) is not the upper limit value (350 W) of the individual power value range (step S14 of FIG. 8: No). Therefore, the setting part 12 sets the power level of the node D one level up, thereby setting the node upper limit power value increased from 230 W to 240 W (step S15 of FIG. 8).

Accordingly, the information processing system in the present invention sets the node upper limit power values of the respective nodes A to D in accordance with the operation conditions of the respective nodes, while keeping the upper limit power value of the whole system. Consequently, it is possible to increase arithmetic processing performance while restricting increase of power consumption and avoiding system down. As a result, it is possible to realize system operation with efficiency and high reliability.

Second Exemplary Embodiment

Figure 9:
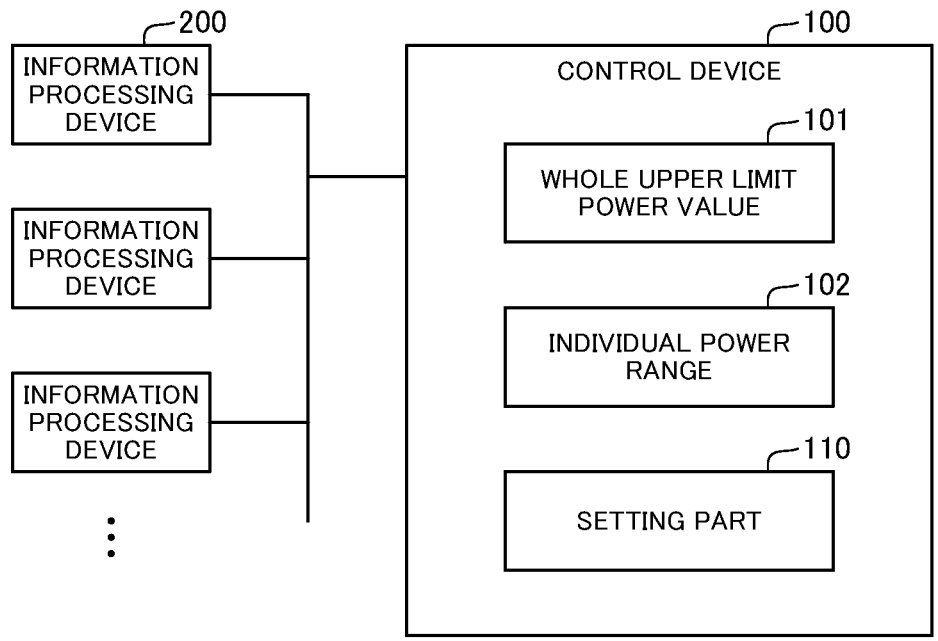
FIG. 9 is a block diagram showing a configuration of the control device in a second exemplary embodiment of the present invention.
Figure 10:
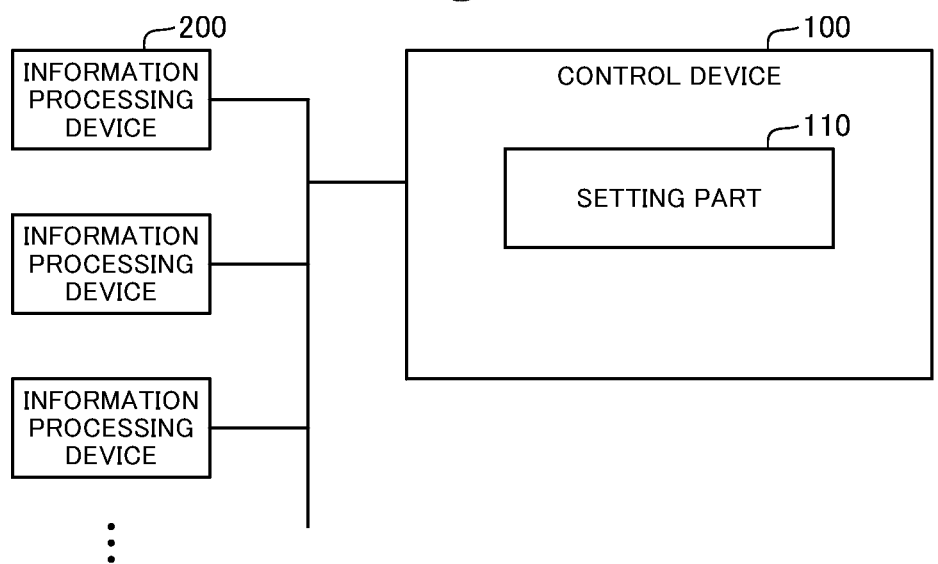
FIG. 10 is a block diagram showing another configuration of the control device in the second exemplary embodiment of the present invention.

Next, a second exemplary embodiment of the present invention will be described with reference to FIGS. 9 to 11. FIGS. 9 to 11 are block diagrams showing the configuration of a control device in the present invention. FIG. 11 is a flowchart showing the operation of the control device.

As shown in FIG. 9, in a control device 100, a whole upper limit power value 101 and an individual power value range 102 are stored. The whole upper limit power value 101 is the upper limit power value of the whole system including a plurality of information processing devices 200, and the individual power value range 102 is composed of a predetermined range of values which can be set on each of the information processing devices. Moreover, the control device 100 includes a setting part 110 which sets the upper limit power value of each of the information processing devices 200 to a value within the individual power value range 102 so that the total of the upper limit power values of the information processing devices 200 does not exceed the whole upper limit power value 101. Herein, the setting part 110 is structured by execution of a program in an arithmetic device included by the control device 100.

Further, as shown in FIG. 10, the control device 100 of the present invention may include only the setting part 110 without storing the whole upper limit power value 101 or the individual power value range 102 described above.

According to the control device described above, first, the setting part 110 acquires information of the whole upper limit power value and the individual power value range from the device itself or from outside (step S101 of FIG. 11). Then, the setting part 110 sets the upper limit power value of each of the information processing devices 200 to a value within the individual power value range 102 (step S102 of FIG. 11). The setting part 110 then sets the upper limit power value of each of the information processing devices 200 so that the total of the upper limit power values of the information processing devices 200 does not exceed the whole upper limit power value 101.

Thus, according to the present invention, while the upper limit power value of the whole system is maintained, an upper limit power value is set for each of the information processing devices within a range where efficient arithmetic performance can be exerted. Therefore, it is possible to increase arithmetic processing performance while restricting power consumption, and it is thereby possible to realize highly efficient and reliable system operation.

Third Exemplary Embodiment

Next, a third exemplary embodiment of the present invention will be described with reference to FIGS. 12 and 13. FIG. 12 is a block diagram showing the configuration of a control device in the present invention. FIG. 13 is a flowchart showing the operation of the control device.

First, as shown in FIG. 12, the control device 100 includes the setting part 110 which is the same as in the second exemplary embodiment. In addition to this, the control device 100 includes a detection part 120 which detects the power value of each of the information processing devices 200. The setting part 110 is configured to, in accordance with the result of comparison of the detected power value of the information processing device 200 with the upper limit power value set on the information processing device 200, set the upper limit power value of the information processing device 200 to a value within the individual power value range so that the total of the upper limit power values of the plurality of information processing devices 200 does not exceed the whole upper limit power value. The setting part 110 and the detection part 120 are structured by execution of a program in an arithmetic device included by the control device 100.

According to the control device described above, first, the setting part 110 acquires information of the whole upper limit power value and the individual power value range from the device itself or from outside (step S111 of FIG. 13). Then, the detection part 120 detects the power value of each of the information processing devices 200 (step S112 of FIG. 13). Then, the setting part 110 compares the detected power value of the information processing device 200 with the upper limit power value set on the information processing device 200 (step S113 of FIG. 13). After that, in accordance with the comparison result, the setting part 110 sets the upper limit power value of the information processing device 200 to a value within the individual power value range so that the total of the upper limit power values of the plurality of information processing devices 200 does not exceed the whole upper limit power value (step S114 of FIG. 13).

Accordingly, in the present invention, while the upper limit power value of the whole system is maintained, an upper limit power value is set for each of the information processing devices within a range where efficient arithmetic performance can be exerted in accordance with the operation state of the information processing device. Therefore, it is possible to increase arithmetic processing performance while restricting power consumption, and it is thereby possible to realize highly efficient and reliable system operation.

<Supplementary Notes>

The whole or part of the exemplary embodiments disclosed above can be described as the following supplementary notes. Below, a control device, a program, and the overall configuration of a control method according to the present invention will be described. However, the present invention is not limited to the following configurations.

(Supplementary Note 1)

A control device, wherein a whole upper limit power value and an individual power value range are stored, the whole upper limit power value being an upper limit power value of a whole system including a plurality of information processing devices, the individual power value range including a predetermined range of values which can be set on each of the information processing devices, the control device comprising a setting part configured to set an upper limit power value of each of the information processing devices to a value within the individual power value range so that a total of upper limit power values of the information processing devices does not exceed the whole upper limit power value.

(Supplementary Note 2)

The control device according to Supplementary Note 1, comprising a detection part configured to detect a power value of each of the information processing devices, wherein the setting part is configured to set, in a case where a total of detected power values of the information processing devices is more than the whole upper limit power value, an upper limit power value of each of the information processing devices to a value within the individual power value range so that a total of upper limit power values of the information processing devices does not exceed the whole upper limit power value.

(Supplementary Note 3)

The control device according to Supplementary Note 1 or 2, wherein the setting part is configured to set upper limit power values of the information processing devices to uniform values within respective individual power value ranges so that a total of the upper limit power values of the information processing devices does not exceed the whole upper limit power value.

(Supplementary Note 4)

The control device according to any of Supplementary Notes 1 to 3, comprising a detection part configured to detect a power value of each of the information processing devices, wherein the setting part is configured to set, in accordance with a result of comparison of the detected power value of the information processing device with an upper limit power value set on the information processing device, the upper limit power value of the information processing device to a value within the individual power value range so that a total of upper limit power values of the respective information processing devices does not exceed the whole upper limit power value.

(Supplementary Note 5)

The control device according to Supplementary Note 4, wherein the setting part is configured to set, in a case where the detected power value of the information processing device is more than an upper limit power value set on the information processing device, the upper limit power value of the information processing device to a larger value than the current upper limit power value within the individual power value range so that a total of upper limit power values of the information processing devices does not exceed the whole upper limit power value.

(Supplementary Note 6)

The control device according to Supplementary Note 4 or 5, wherein the setting part is configured to set, in a case where the detected power value of the information processing device is less than an upper limit power value set on the information processing device, the upper limit power value of the information processing device to a smaller value than the current upper limit power value within the individual power value range so that a total of upper limit power values of the information processing devices does not exceed the whole upper limit power value.

(Supplementary Note 7)

The control device according to any of Supplementary Notes 4 to 6, wherein the setting part is configured to set, in a case where the detected power value of the information processing device is less than an upper limit power value set on the information processing device and is not within the individual power value range, the upper limit power value of the information processing device to a smaller value than a lower limit value of the individual power value range so that a total of upper limit power values of the information processing devices does not exceed the whole upper limit power value.

(Supplementary Note 8)

The control device according to any of Supplementary Notes 4 to 7, wherein:

the detection part is configured to detect power values of the respective information processing devices in sequence; and the setting part is configured to set, every time a power value of the information processing device is detected by the detection part, an upper limit power value of the information processing device so that a total of upper limit power values of the information processing devices does not exceed the whole upper limit power value.

(Supplementary Note 9)

A control device comprising a setting part configured to set an upper limit power value of each of a plurality of information processing devices to a value within an individual power value range including a predetermined range of values which can be set on each of the information processing devices so that a total of upper limit power values of the information processing devices does not exceed a whole upper limit power value, the whole upper limit power value being an upper limit power value of a whole system including the information processing devices.

(Supplementary Note 10)

The control device according to Supplementary Note 9, comprising a detection part configured to detect a power value of each of the information processing devices, wherein the setting part is configured to set, in a case where a total of detected power values of the information processing devices is more than the whole upper limit power value, an upper limit power value of each of the information processing devices to a value within the individual power value range so that a total of upper limit power values of the information processing devices does not exceed the whole upper limit power value.

(Supplementary Note 11)

The control device according to Supplementary Note 9 or 10, wherein the setting part is configured to set upper limit power values of the information processing devices to uniform values within respective individual power value ranges so that a total of the upper limit power values of the information processing devices does not exceed the whole upper limit power value.

(Supplementary Note 12)

The control device according to any of Supplementary Notes 9 to 11, comprising a detection part configured to detect a power value of each of the information processing devices, wherein the setting part is configured to set, in accordance with a result of comparison of the detected power value of the information processing device with an upper limit power value set on the information processing device, the upper limit power value of the information processing device to a value within the individual power value range so that a total of upper limit power values of the respective information processing devices does not exceed the whole upper limit power value.

(Supplementary Note 12.1)

The control device according to Supplementary Note 12, wherein the setting part is configured to set, in a case where the detected power value of the information processing device is more than an upper limit power value set on the information processing device, the upper limit power value of the information processing device to a larger value than the current upper limit power value within the individual power value range so that a total of upper limit power values of the information processing devices does not exceed the whole upper limit power value.

(Supplementary Note 12.2)

The control device according to Supplementary Note 12 or 12.1, wherein the setting part is configured to set, in a case where the detected power value of the information processing device is less than an upper limit power value set on the information processing device, the upper limit power value of the information processing device to a smaller value than the current upper limit power value within the individual power value range so that a total of upper limit power values of the information processing devices does not exceed the whole upper limit power value.

(Supplementary Note 12.3)

The control device according to any of Supplementary Notes 12 to 12.2, wherein the setting part is configured to set, in a case where the detected power value of the information processing device is less than an upper limit power value set on the information processing device and is not within the individual power value range, the upper limit power value of the information processing device to a smaller value than a lower limit value of the individual power value range so that a total of upper limit power values of the information processing devices does not exceed the whole upper limit power value.

(Supplementary Note 12.4)

The control device according to any of Supplementary Notes 12 to 12.3, wherein:

the detection part is configured to detect power values of the respective information processing devices in sequence; and the setting part is configured to set, every time a power value of the information processing device is detected by the detection part, an upper limit power value of the information processing device so that a total of upper limit power values of the information processing devices does not exceed the whole upper limit power value.

(Supplementary Note 13)

A control method comprising setting an upper limit power value of each of a plurality of information processing devices to a value within an individual power value range including a predetermined range of values which can be set on each of the information processing devices so that a total of upper limit power values of the information processing devices does not exceed a whole upper limit power value, the whole upper limit power value being an upper limit power value of a whole system including the information processing devices.

(Supplementary Note 14)

The control method according to Supplementary Note 13, comprising:

detecting a power value of each of the information processing devices; and setting, in a case where a total of detected power values of the information processing devices is more than the whole upper limit power value, an upper limit power value of each of the information processing devices to a value within the individual power value range so that a total of upper limit power values of the information processing devices does not exceed the whole upper limit power value.

(Supplementary Note 15)

The control method according to Supplementary Note 13 or 14, comprising setting upper limit power values of the information processing devices to uniform values within respective individual power value ranges so that a total of the upper limit power values of the information processing devices does not exceed the whole upper limit power value.

(Supplementary Note 16)

The control method according to any of Supplementary Notes 13 to 15, comprising:

detecting a power value of each of the information processing devices; and setting, in accordance with a result of comparison of the detected power value of the information processing device with an upper limit power value set on the information processing device, the upper limit power value of the information processing device to a value within the individual power value range so that a total of upper limit power values of the respective information processing devices does not exceed the whole upper limit power value.

(Supplementary Note 17)

The control method according to Supplementary Note 16, comprising setting, in a case where the detected power value of the information processing device is more than an upper limit power value set on the information processing device, the upper limit power value of the information processing device to a larger value than the current upper limit power value within the individual power value range so that a total of upper limit power values of the information processing devices does not exceed the whole upper limit power value.

(Supplementary Note 18)

The control method according to Supplementary Note 16 or 17, comprising setting, in a case where the detected power value of the information processing device is less than an upper limit power value set on the information processing device, the upper limit power value of the information processing device to a smaller value than the current upper limit power value within the individual power value range so that a total of upper limit power values of the information processing devices does not exceed the whole upper limit power value.

(Supplementary Note 19)

The control method according to any of Supplementary Notes 16 to 18, comprising setting, in a case where the detected power value of the information processing device is less than an upper limit power value set on the information processing device and is not within the individual power value range, the upper limit power value of the information processing device to a smaller value than a lower limit value of the individual power value range so that a total of upper limit power values of the information processing devices does not exceed the whole upper limit power value.

(Supplementary Note 20)

The control method according to any of Supplementary Notes 16 to 19, comprising:

detecting power values of the respective information processing devices in sequence; and setting, every time a power value of the information processing device is detected, an upper limit power value of the information processing device so that a total of upper limit power values of the information processing devices does not exceed the whole upper limit power value.

(Supplementary Note 21)

A computer-readable medium storing a program comprising instructions for causing a control device to realize a setting part configured to set an upper limit power value of each of a plurality of information processing devices to a value within an individual power value range including a predetermined range of values which can be set on each of the information processing devices so that a total of upper limit power values of the information processing devices does not exceed a whole upper limit power value, the whole upper limit power value being an upper limit power value of a whole system including the information processing devices.

(Supplementary Note 22)

The computer-readable medium storing the program according to Supplementary Note 21, comprising instructions for further causing the control device to realize a detection part configured to detect a power value of each of the information processing devices, wherein the setting part is configured to set, in a case where a total of detected power values of the information processing devices is more than the whole upper limit power value, an upper limit power value of each of the information processing devices to a value within the individual power value range so that a total of upper limit power values of the information processing devices does not exceed the whole upper limit power value.

(Supplementary Note 23)

The computer-readable medium storing the program according to Supplementary Note 21 or 22, wherein the setting part is configured to set upper limit power values of the information processing devices to uniform values within respective individual power value ranges so that a total of the upper limit power values of the information processing devices does not exceed the whole upper limit power value.

(Supplementary Note 24)

The computer-readable medium storing the program according to any of Supplementary Notes 21 to 23, comprising instructions for further causing the control device to realize a detection part configured to detect a power value of each of the information processing devices, wherein the setting part is configured to set, in accordance with a result of comparison of the detected power value of the information processing device with an upper limit power value set on the information processing device, the upper limit power value of the information processing device to a value within the individual power value range so that a total of upper limit power values of the respective information processing devices does not exceed the whole upper limit power value.

(Supplementary Note 25)

The computer-readable medium storing the program according to Supplementary Note 24, wherein the setting part is configured to set, in a case where the detected power value of the information processing device is more than an upper limit power value set on the information processing device, the upper limit power value of the information processing device to a larger value than the current upper limit power value within the individual power value range so that a total of upper limit power values of the information processing devices does not exceed the whole upper limit power value.

(Supplementary Note 26)

The computer-readable medium storing the program according to Supplementary Notes 24 or 25, wherein the setting part is configured to set, in a case where the detected power value of the information processing device is less than an upper limit power value set on the information processing device, the upper limit power value of the information processing device to a smaller value than the current upper limit power value within the individual power value range so that a total of upper limit power values of the information processing devices does not exceed the whole upper limit power value.

(Supplementary Note 27)

The computer-readable medium storing the program according to any of Supplementary Notes 24 to 26, wherein the setting part is configured to set, in a case where the detected power value of the information processing device is less than an upper limit power value set on the information processing device and is not within the individual power value range, the upper limit power value of the information processing device to a smaller value than a lower limit value of the individual power value range so that a total of upper limit power values of the information processing devices does not exceed the whole upper limit power value.

(Supplementary Note 28)

The computer-readable medium storing the program according to any of Supplementary Notes 24 to 27, wherein:

the detection part is configured to detect power values of the respective information processing devices in sequence; and the setting part is configured to set, every time a power value of the information processing device is detected by the detection part, an upper limit power value of the information processing device so that a total of upper limit power values of the information processing devices does not exceed the whole upper limit power value.

The abovementioned program is stored in a storage device or recorded on a computer-readable recording medium. For example, the recording medium is a portable medium such as a flexible disk, an optical disk, a magneto-optical disk and a semiconductor memory.

Although the present invention is described above with reference to the exemplary embodiments and so on, the present invention is not limited to the exemplary embodiments described above. The configurations and details of the present invention can be changed in various manners that can be understood by one skilled in the art within the scope of the present invention.

DESCRIPTION OF REFERENCE NUMERALS 1 power supply device
10 control device
11 detection part
12 setting part
13 storage part
14 register
21 BMC
22 sensor
A to D node
100 control device
101 whole upper limit power value
102 individual power range
110 setting part
120 detection part
200 information processing device

The invention claimed is:

1. A control device configured to store a whole upper limit power value and an individual power value range, the control device comprising:
a setting part,
wherein the whole upper limit power value is an upper limit power value of a whole system including a plurality of information processing devices,
wherein the individual power value range includes a predetermined range of values which can be set on each of the plurality of information processing devices,
wherein the individual power value range represents a range of power values determined to exhibit high arithmetic processing efficiency with respect to power consumption of the each of the plurality of information processing devices and
wherein the setting part is configured to set an upper limit power value of each of the plurality of information processing devices to a value within the individual power value range so that a total of upper limit power values of the plurality of information processing devices does not exceed the whole upper limit power value.

2. The control device according to claim 1, further comprising:
a detection part configured to detect a power value of each of the plurality of information processing devices,
wherein the setting part is further configured to set, in a case where a total of detected power values of the plurality of information processing devices is more than the whole upper limit power value, an upper limit power value of each of the plurality of information processing devices to a value within the individual power value range so that a total of upper limit power values of the plurality of information processing devices does not exceed the whole upper limit power value.

3. The control device according to claim 1, wherein the setting part is further configured to set upper limit power values of the plurality of information processing devices to uniform values within respective individual power value ranges so that a total of the upper limit power values of the plurality of information processing devices does not exceed the whole upper limit power value.

4. The control device according to claim 1, further comprising:
a detection part configured to detect a power value of each of the plurality of information processing devices,
wherein the setting part is further configured to set, in accordance with a result of comparison of a detected power value of an information processing device with an upper limit power value set on the information processing device, the upper limit power value of the information processing device to a value within the individual power value range so that a total of upper limit power values of the plurality of information processing devices does not exceed the whole upper limit power value.

5. The control device according to claim 4, wherein the setting part is further configured to set, in a case where the detected power value of the information processing device is more than the upper limit power value set on the information processing device, the upper limit power value of the information processing device to a value larger than the current upper limit power value within the individual power value range so that a total of upper limit power values of the plurality of information processing devices does not exceed the whole upper limit power value.

6. The control device according to claim 4, wherein the setting part is further configured to set, in a case where the detected power value of the information processing device is less than the upper limit power value set on the information processing device, the upper limit power value of the information processing device to a value smaller than the current upper limit power value within the individual power value range so that a total of upper limit power values of the plurality of information processing devices does not exceed the whole upper limit power value.

7. The control device according to claim 4, wherein the setting part is further configured to set, in a case where the detected power value of the information processing device is less than the upper limit power value set on the information processing device and is not within the individual power value range, the upper limit power value of the information processing device to a value smaller than a lower limit value of the individual power value range so that a total of upper limit power values of the plurality of information processing devices does not exceed the whole upper limit power value.

8. The control device according to claim 4, wherein:
the detection part is further configured to detect power values of the plurality of information processing devices in sequence, and
the setting part is further configured to set, every time a power value of the information processing device is detected by the detection part, an upper limit power value of the information processing device so that a total of upper limit power values of the plurality of information processing devices does not exceed the whole upper limit power value.

9. A control device, comprising
a setting part configured to set an upper limit power value of each of a plurality of information processing devices to a value within an individual power value range including a predetermined range of values which can be set on each of the information processing devices so that a total of upper limit power values of the information processing devices does not exceed a whole upper limit power value, wherein the whole upper limit power value is an upper limit power value of a whole system including the information processing devices, and wherein the individual power value range represents a range of power values determined to exhibit high arithmetic processing efficiency with respect to power consumption of the each of the plurality of information processing devices.

10. The control device according to claim 9, further comprising:

a detection part configured to detect a power value of each of the plurality of information processing devices, wherein the setting part is further configured to set, in a case where a total of detected power values of the plurality of information processing devices is more than the whole upper limit power value, an upper limit power value of each of the plurality of information processing devices to a value within the individual power value range so that a total of upper limit power values of the plurality of information processing devices does not exceed the whole upper limit power value.

11. The control device according to claim 9, wherein the setting part is further configured to set upper limit power values of the plurality of information processing devices to uniform values within respective individual power value ranges so that a total of the upper limit power values of the plurality of information processing devices does not exceed the whole upper limit power value.

12. The control device according to claim 9, further comprising:

a detection part configured to detect a power value of each of the plurality of information processing devices, wherein the setting part is further configured to set, in accordance with a result of comparison of a detected power value of an information processing device with an upper limit power value set on the information processing device, the upper limit power value of the information processing device to a value within the individual power value range so that a total of upper limit power values of the plurality of information processing devices does not exceed the whole upper limit power value.

13. A control method, comprising:

setting an upper limit power value of each of a plurality of information processing devices to a value within an individual power value range including a predetermined range of values which can be set on each of the information processing devices so that a total of upper limit power values of the information processing devices does not exceed a whole upper limit power value, wherein the whole upper limit power value is an upper limit power value of a whole system including the information processing devices, and wherein the individual power value range represents a range of power values determined to exhibit high arithmetic processing efficiency with respect to power consumption of the each of the plurality of information processing devices.

14. The control method according to claim 13, further comprising:

detecting a power value of each of the plurality of information processing devices; and setting, in a case where a total of detected power values of the plurality of information processing devices is more than the whole upper limit power value, an upper limit power value of each of the plurality of information processing devices to a value within the individual power value range so that a total of upper limit power values of the plurality of information processing devices does not exceed the whole upper limit power value.

15. The control method according to claim 13, further comprising:

setting upper limit power values of the plurality of information processing devices to uniform values within respective individual power value ranges so that a total of the upper limit power values of the plurality of information processing devices does not exceed the whole upper limit power value.

16. The control method according to claim 13, further comprising:

detecting a power value of each of the plurality of information processing devices; and setting, in accordance with a result of comparison of a detected power value of an information processing device with an upper limit power value set on the information processing device, the upper limit power value of the information processing device to a value within the individual power value range so that a total of upper limit power values of the plurality of information processing devices does not exceed the whole upper limit power value.

17. The control method according to claim 16, further comprising:

setting, in a case where the detected power value of the information processing device is more than the upper limit power value set on the information processing device, the upper limit power value of the information processing device to a value larger than the current upper limit power value within the individual power value range so that a total of upper limit power values of the plurality of information processing devices does not exceed the whole upper limit power value.

18. The control method according to claim 16, further comprising:

setting, in a case where the detected power value of the information processing device is less than the upper limit power value set on the information processing device, the upper limit power value of the information processing device to a value smaller than the current upper limit power value within the individual power value range so that a total of upper limit power values of the plurality of information processing devices does not exceed the whole upper limit power value.

19. The control method according to claim 16, further comprising:

setting, in a case where the detected power value of the information processing device is less than the upper limit power value set on the information processing device and is not within the individual power value range, the upper limit power value of the information processing device to a value smaller than a lower limit value of the individual power value range so that a total of upper limit power values of the plurality of information processing devices does not exceed the whole upper limit power value.

20. The control method according to claim 16, further comprising:

detecting power values of the plurality of information processing devices in sequence; and setting, every time a power value of the information processing device is detected, an upper limit power value of the information processing device so that a total of upper limit power values of the plurality of information processing devices does not exceed the whole upper limit power value.

* * * * *